Sept. 21, 1926.  
J. D. SARTAKOFF  
OIL TESTER  
Filed June 24, 1924
1,600,250
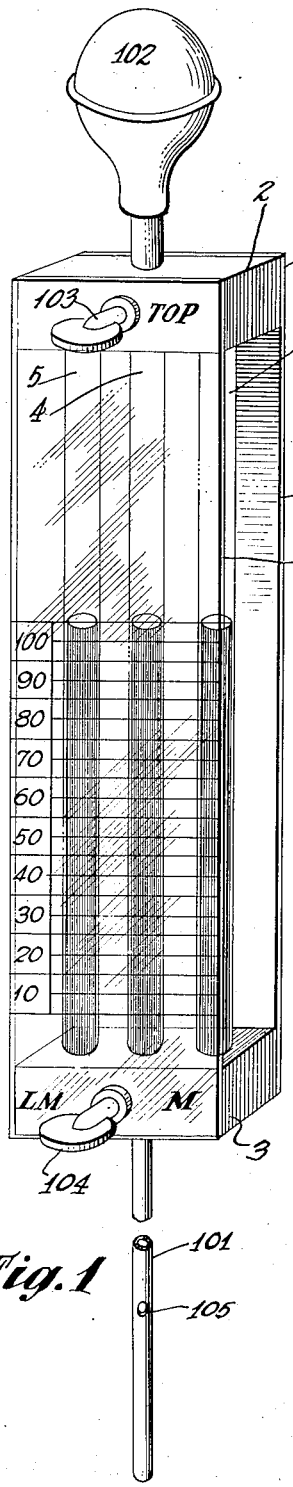
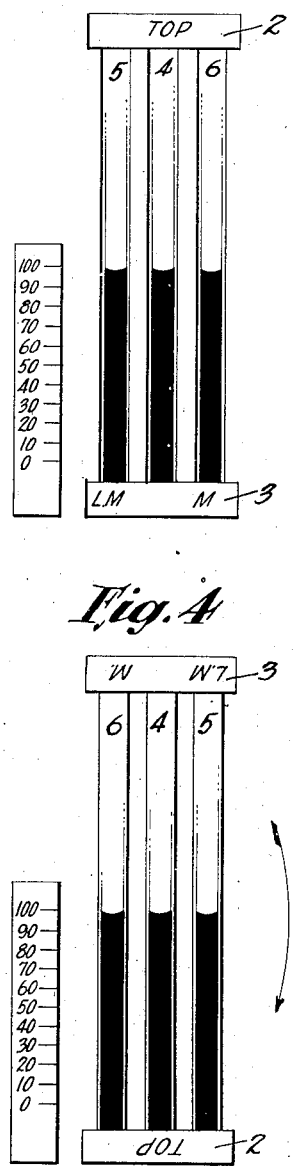
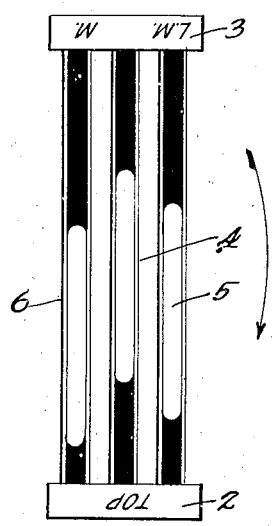
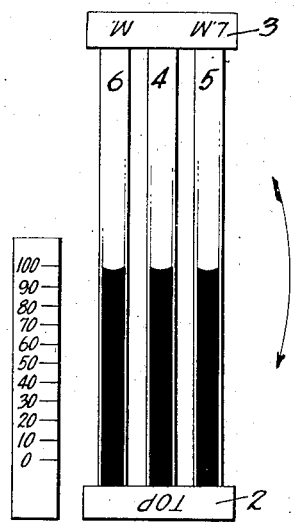
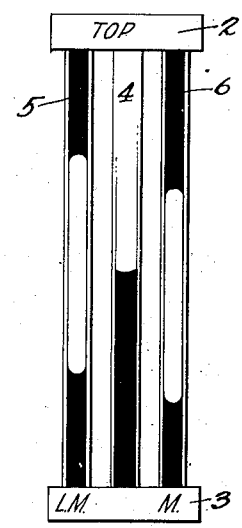
INVENTOR.  
Jack D. Sartakoff  
BY Jas. H. Griffin  
ATTORNEYS.

Patented Sept. 21, 1926.

1,600,250

UNITED STATES PATENT OFFICE.

JACK D. SARTAKOFF, OF NEW YORK, N. Y., ASSIGNOR OF ONE-HALF TO J. D. SARTAKOFF CORPORATION, OF NEW YORK, N. Y., A CORPORATION OF NEW YORK, AND ONE-HALF TO KHETAH CORPORATION, OF NEW YORK, N. Y., A CORPORATION OF NEW YORK.

OIL TESTER.

Application filed June 24, 1924. Serial No. 722,007.

This invention is an oil tester intended, more particularly, for the testing of motor lubricating oils.

The object of the invention is to provide a simple, economical and efficient form of device which may readily be carried about in the tool box of the car and be convenient for the making of a test at any time by the motorist.

An important feature of the invention resides in the fact that no technical knowledge whatsoever is required to make a thoroughly reliable test which will be thoroughly comprehensible to the most inexperienced and untrained mind. In this the invention bears marked contrast to laboratory prior viscosity measuring apparatus wherein only those possessing a high degree of technical training are able to obtain satisfactory tests and this invention should not be confused therewith.

Another important feature of the invention is found in the fact that the use of thermometers and other apparatus heretofore considered important in the making of viscosity tests are not utilized when utilizing the present invention, the test being carried on at atmospheric temperature and without associated cooling or heating baths of independent solutions, such as brine, etc.

Much of the apparatus heretofore suggested for the measuring of the viscosity of lubricants depend upon the action of floats, buoyant pistons and the like and by these attempts are made to definitely measure the viscosity of liquids. Apparatus of this character depends for its operation largely upon the particular specific gravities of the liquids to be measured, but inasmuch as it is now well recognized that lubricants of substantially the same specific gravity may widely differ in viscosity, it is apparent that apparatus which operates on these principles is misleading and incorrect.

Speaking generally, the device of the present invention operates, broadly stated, on the theory of comparison between one or more bodies of oil of a known viscosity and an additional body of the oil to be tested. In other words, in accordance with this invention at least two distinct bodies of oil are caused to flow simultaneously in the same direction and under the same physical conditions and of these bodies, one embodies oil of known characteristics while the other body is of the oil to be tested. The relative rates of flow between the two bodies serves as a measure of comparison. In the preferred practical form of the invention, the device embodies a suitable holder in which at least two transparent tubes are mounted in fixed parallel position. These tubes are preferably of glass of equal length and of uniform equal interior diameter. They are positioned side by side and in juxtaposition with them is a suitable reading scale. One of the tubes contains a quantity of oil of a character commonly used in internal combustion engines; for example, such oil as is generally known to the market as medium. This tube is permanently sealed. Another tube is provided with a suitable inlet which may conveniently be in the form of a flexible pipe, the free end of which is adapted to be immersed in the oil to be tested, while the other end of the tube is provided with a bulb, piston or other suitable means for drawing a quantity of the oil to be tested into the interior of said tube. Additional tubes having sealed quantities of oils of other grades or viscosity may be incorporated in the device in parallel relation to the two tubes hereinbefore mentioned, but two tubes are sufficient for the making of a comparison test.

In the two tube device, it is assumed that if medium, light medium, heavy, extra heavy oil, etc., is to be tested, the tube which constitutes the standard of comparison will contain oil of the viscosity which the oil to be tested is supposed to be.

Associated with the device are suitable valves or other appropriate means, so that after a quantity of the oil to be tested has been drawn into the testing tube, the testing tube may be sealed prior to carrying out the actual test. After the oil to be tested has been sealed within the testing tube, it is only necessary to invert the device one or more times to cause the oil in both tubes to simultaneously flow longitudinally of the tubes in order that the relative speed of flow which will be proportional to the viscosity and gravity of the two oils, may be observed the reading scale making it possible to accurately determine the ratio between the speeds of flow of the two oils.

In this manner, a very clear comparison is obtained between the rate of flow of the oil which constitutes the standard of comparison and the rate of flow of the oil under test and when this comparison is known, it will correspond to the ratio between the viscosities of the two lubricants.

Features of the invention, other than those adverted to, will be apparent from the hereinafter detailed description and claims, when read in conjunction with the accompanying drawings.

The accompanying drawings illustrate one practical embodiment of the invention, but the construction therein shown, is to be understood as illustrative, only, and not as defining the limits of the invention.

Figure 1 shows the present invention in its preferred practical form; and

Figures 2, 3, 4 and 5 are diagrammatic views showing the manner in which the device is manipulated to effect the desired comparison.

Referring to the drawings, 1 designates a suitable holder shown as comprising end walls 2 and 3 spaced apart and forming supports for the opposite ends of tubes 4, 5 and 6 of which three are shown. These tubes are anchored at their opposite ends in the end walls 2 and 3, are of the same length and of uniform interior diameter, and are positioned in parallel relation to one another.

The front plate 7 of transparent material such for example as glass or celluloid preferably extends over the front of these tubes and secured at its top and bottom to the end walls 1 and 3 while the back plate 8 is similarly disposed rearwardly of said tubes. The back plate may be of any suitable material and is preferably opaque while the transparent front plate 7 is provided with a vertically graduated scale properly proportioned, for example from 10 to 100 in order to facilitate reading of comparisons.

In practice, only two tubes are actually required, but for the purpose of illustration three are shown so as to enable the test of oils of two well defined viscosities. In the illustrative showing of the drawings, the tube 4 constitutes the testing tube while the tubes 5 and 6 constitute the standard tubes, so called because oils adapted to be contained therein constitute the standards of comparison.

Inasmuch as it is my desire to provide for the motor car owner a device which will enable him to test his engine oil, I have preferred to incorporate into the device, three tubes as shown. The reason for this is that engines usually use oil of one viscosity in summer and oil of a different viscosity in winter. For example, one well known make of car uses medium oil in summer and light medium in winter and the showing of the accompanying drawings is such as is adapted for use in conjunction with a car of this character. To this end, I seal within the tube 5 a quantity of "light medium" oil the tube containing a column up to the 100 graduation on the scale. In the tube 6 is sealed a like column of "medium oil". Thus, the oils within the tubes 5 and 6 constitute the two standards of comparison by which oils for use in this particular character of car should be tested.

Associated with the lower end of the tube 4 is an inlet pipe 101 which may conveniently partake of the form of a flexible hose and with the upper end of the tube 4 is associated a bulb 102 or any other suitable means for producing a minus pressure within the tube 4, so that if the hose 101 is inserted into a body of oil and the bulb 102 operated a quantity of such oil may be drawn into the tube 4. Valves 103 and 104 are associated with the opposite ends of the tube 4, so that after the desired amount of oil has been drawn into the testing tube 4, the opposite ends thereof may be sealed. At the start of the testing operation and after charging the testing tube 4, the oil levels in all of the tubes should be the same, as shown in Figure 2. The test may now be carried on in the following manner.

From the upright position of Figure 2, the device is inverted, and, as shown in Figure 3, the oil in all three tubes will flow at speeds controlled by the viscosities to the opposite ends of the tubes until the oil columns partake of the positions of rest in the inverted device as shown in Figure 4. The device is now turned right side up and all three oils immediately commence to resume their initial position shown in Figure 2. However, the speed of flow will be substantially inversely proportional to the viscosities of these oils, so that the oil of lowest viscosity will flow the fastest. The one who is carrying out the test carefully watches the oil columns accumulate in the testing tube and the particular tube which is to constitute the standard of comparison. For the present example, if it is assumed that the oil under test should be medium, the relative speed of flow between the oil in the tube 4 and the oil in the tube 6 is observed and careful attention is directed to the noting of the oil column which first reaches the 100 graduation of the scale.

In the illustrative showing of Figure 5, the columns are shown at the instant of the completion of a typical test and from this figure it will be noted that the oil in the testing tube has risen to the 100 graduation of the scale, while the oil in the standard of comparison tube 6 has risen only to 30, thereby showing that the viscosity of the oil under test which is contained in the tube 4 is of approximately 30/100 or 30 percent of the viscosity of the oil contained in the tube 6 and if the specifications of the motor in which this oil is being used or is to be used requires an oil of the same viscosity as is contained in the tube 6, it is apparent that the oil which has been tested is entirely unfit for use in such an engine. This test may to advantage be carried on with oil which has been used for some time in the lubrication of an engine to determine whether or not new oil is required or it can be carried out to test oil prior to placing the oil in the engine in order to determine whether the oil is proper for such engine.

By constructing the device of three tubes with the tubes 5 and 6 containing respectively light medium and medium oils, the device may be employed to advantage in the testing of oils for engines employing a light medium oil in winter and a medium oil in summer. Manifestly, different oils might be sealed within the tubes 5 and 6 so as to render the device appropriate to engines employing other than medium and light medium oils, but in any case, the mode of comparison and the spirit of this invention will be the same.

It will be apparent that inasmuch as the tubes are positioned side by side in parallel relation, the oil under test will be subjected to identical conditions as the oil which is utilized as the standard of comparison. I find in practice that when testing crank case oil, it is advantageous to test it after the motor has been standing idle for a time so that sediment which may be contained in the crank case will have settled out before the oil is drawn into testing tubes as the absence of sediment will enable a more accurate comparison to be obtained since oil for such a test is frequently drawn directly from the crank case.

I preferably form the inlet 105 of the pipe 101 at a point removed from the end of the pipe and close the extreme end of the pipe so that when the pipe is introduced into the crank case through the breather pipe or oil inlet pipe to the motor, the sediment in the base of the crank case will not be sucked into the testing tube 4.

In the form of the invention, which I have taken for illustration, the reading scale is graduated in order to obtain percentages. I am aware however that if I have in the comparison tube a fluid with a known rate of flow with reference to the element of time, the scale may be collated for seconds so that by watching the flow of the liquid in the testing tube until it reaches a predetermined point and then noting the liquid level in the comparison tube it will show definitely the number of seconds which the liquid in the testing tube has taken to arrive at such level and therefore a reading will be obtained showing the number of sections required for the flow of the tested fluid.

In the preferred form of the invention, and in interest of economy, I preferably make the tubes of uniform diameter throughout their lengths although, in practice, these tubes may be of hour glass shape, i. e., having reservoirs at their opposite ends connected by a constricted passage.

Having thus fully described the invention, what I claim as new and desire to secure by Letters Patent is:

1. An oil tester embodying a suitable holder, a comparison tube supported by the holder and containing a liquid to serve as a standard of comparison, a testing tube carried by the holder in parallel relation to the comparison tube, a bulb associated with one end of the testing tube, a conduit leading from the other end of the testing tube, whereby the bulb may be operated to draw a predetermined quantity of liquid to be tested into the testing tube, there being a valve at each end of the testing tube for thereupon sealing the testing tube.

2. An oil tester embodying a suitable holder, a comparison tube supported by the holder and containing a liquid to serve as a standard of comparison, a testing tube carried by the holder in parallel relation to the comparison tube, a bulb associated with one end of the testing tube, a conduit leading from the other end of the testing tube, whereby the bulb may be operated to draw a predetermined quantity of liquid to be tested into the testing tube, therebefore a valve at each end of the testing tube for thereupon sealing the latter, and a graduated scale associated with the tubes for facilitating a comparative reading.

3. An oil tester embodying a suitable holder, a comparison tube carried by the holder and containing a liquid to serve as a standard of comparison, a testing tube also carried by the holder in parallel relation to the comparison tube, suction means associated with one end of the testing tube, and a conduit leading from the other end of the testing tube, whereby the suction means may be operated to draw a predetermined quantity of liquid to be tested into the testing tube, there being a valve at each end of the testing tube for thereupon sealing the testing tube.

In testimony whereof I have signed the foregoing specification.

JACK D. SARTAKOFF.